United States Patent
Suiter et al.

(10) Patent No.: US 10,334,134 B1
(45) Date of Patent: Jun. 25, 2019

(54) AUGMENTED REAL ESTATE WITH LOCATION AND CHATTEL TAGGING SYSTEM AND APPARATUS FOR VIRTUAL DIARY, SCRAPBOOKING, GAME PLAY, MESSAGING, CANVASING, ADVERTISING AND SOCIAL INTERACTION

(71) Applicants: Maximillian John Suiter, Omaha, NE (US); Ian Padraic Suiter, Omaha, NE (US); Sean Patrick Suiter, Omaha, NE (US)

(72) Inventors: Maximillian John Suiter, Omaha, NE (US); Ian Padraic Suiter, Omaha, NE (US); Sean Patrick Suiter, Omaha, NE (US)

( * ) Notice: Subject to any disclaimer, the term of this patent is extended or adjusted under 35 U.S.C. 154(b) by 26 days.

(21) Appl. No.: 15/231,241

(22) Filed: Aug. 8, 2016

Related U.S. Application Data

(60) Provisional application No. 62/352,433, filed on Jun. 20, 2016.

(51) Int. Cl.
*H04N 5/232* (2006.01)
*H04N 1/21* (2006.01)
*G06F 16/78* (2019.01)
*G06K 9/00* (2006.01)
*H04N 1/00* (2006.01)

(52) U.S. Cl.
CPC ........... *H04N 1/2125* (2013.01); *G06F 16/78* (2019.01); *G06K 9/00671* (2013.01); *H04N 1/00244* (2013.01); *H04N 1/212* (2013.01); *H04N 5/23293* (2013.01); *H04N 2201/0084* (2013.01)

(58) Field of Classification Search
CPC .. H04N 1/2125; H04N 1/212; H04N 1/00244; H04N 5/23293; H04N 2201/0084; G06K 9/00671; G06F 17/30817
See application file for complete search history.

(56) References Cited

U.S. PATENT DOCUMENTS

| | | | |
|---|---|---|---|
| 9,104,293 B1 | 8/2015 | Kornfeld | |
| 2007/0032244 A1* | 2/2007 | Counts | H04W 8/14 455/456.1 |
| 2012/0268490 A1 | 10/2012 | Sugden | |
| 2014/0118483 A1* | 5/2014 | Rapoport | H04N 5/23258 348/36 |
| 2014/0237578 A1* | 8/2014 | Bryant | G06Q 10/10 726/7 |
| 2015/0029180 A1* | 1/2015 | Komatsu | G06T 19/006 345/419 |

(Continued)

OTHER PUBLICATIONS

Collins, Katie, "Leave digital gifts in physical locations with traces app", http://www.wired.co.uk/article/traces-messaging-app, Aug. 5, 2014, 11 pages.

(Continued)

*Primary Examiner* — Albert H Cutler
(74) *Attorney, Agent, or Firm* — Suiter Swantz pc llo

(57) ABSTRACT

A device based system for interacting around a collection of user definable moments portraying a theme readable by others via a filter. Users may participate actively, voyeuristically, passively, or vicariously, to share propaganda, graffiti, news, parody, satire, opinions, information, commentary, entertainment, contests, and amusement to a location or an object.

20 Claims, 17 Drawing Sheets

(56) References Cited

U.S. PATENT DOCUMENTS

| | | | |
|---|---|---|---|
| 2015/0356063 A1* | 12/2015 | Jiang | G06F 17/30964 |
| | | | 715/232 |
| 2016/0283595 A1* | 9/2016 | Folkens | G06F 3/013 |
| 2017/0132267 A1* | 5/2017 | Zhou | G06F 17/30345 |
| 2017/0150037 A1* | 5/2017 | Rathod | H04N 5/23216 |
| 2017/0185869 A1* | 6/2017 | Dua | G06K 9/52 |
| 2017/0193300 A1 | 7/2017 | Shatz | |
| 2017/0195554 A1* | 7/2017 | Shatz | H04N 5/23216 |
| 2017/0256097 A1* | 9/2017 | Finn | G06T 19/006 |

OTHER PUBLICATIONS

Jardin, Xeni, "Pip, new minimalist messaging app, promises easy update to friends", https://boingboing.net/2014/12/04/pip-new-minimalist-messaging.html, Dec. 4, 2014, 2 pages.

Knibbs, Kate, "Is this the first annonymous app that understands the power of secrets?", https://www.dailydot.com/debug/yik-yak-app/, Mar. 21, 2014, 4 pages.

Lawler, Ryan, "Whisper Confirms $36M in New Funding, Adds Related Posts, Categories, and Explore Feature to App", https://techcrunch.com/2014/05/19/whisper-v4, May 19, 2014, 2 pages.

Martellaro, John, "Spyglass for iOS: Powerful Navigational Instrument", https://www.macobserver.com/tmo/review/spyglass_for_ios_powerful_navigational_instruction, Jun. 27, 2011, 5 pages.

\* cited by examiner

AUGMENTED REAL ESTATE WITH LOCATION AND CHATTEL TAGGING SYSTEM AND APPARATUS FOR VIRTUAL DIARY, SCRAPBOOKING, GAME PLAY, MESSAGING, CANVASING, ADVERTISING AND SOCIAL INTERACTION

RELATED APPLICATION

The present application claims priority under 35 U.S.C § 119 to U.S. Provisional patent application 62/352,433, filed on Jun. 20, 2016. Said provisional application is hereby incorporated herein by reference in its entirety.

TECHNICAL FIELD

The present invention is generally related to apparatus and systems for sending messages and more particularly to a system and apparatus for constructing and sharing an augmented interactive landscape or the like.

SUMMARY OF THE INVENTION

The present disclosure teaches a device allowing users to augment the environment with media files accessible and identified by an icon tagged to a particular location or object and accessible by users proximate to the tagged location.

Individuals interact with their environment on a continual basis. Certain moments may occur where an interaction with a place, thing, person, article, thought, feeling, or the like may occur. Such moments, indeed all moments, are multi-dimensional and/or multisensory. Each moment, whether ignored or passed without notice, or contemplated, generally includes all of a persons senses, a time and date, a location, and a set of things involved in the moment, e.g., a sound, a song, a video, some text, a conversation, a three-dimensional object, a place, a person, or group of people, a landscape, a view, or the like. Such moments produce thoughts and or feelings. Recording such moments for sharing and herme-neutics (context) for a particular set of circumstances is desirable. A moment may be a simple reminder or a multi-dimensional (multisensory) reminder (one which generates a mood or feeling) or for communicating the feelings attached to the context of experiencing a particular moment to a select group of friends, a filtered audience or broadcast unfiltered to complete strangers.

In one embodiment of the present invention a recording of a moment may be shared with a party that has moved near or to the location from which a particular moment (encounter) was recorded. Likewise, a time, thing, person, object or position may recall a recorded moment to another. In operation, a 104 or the like (smart device, iPhone, iPad, tablet, Android device, Surface) may be utilized to record and read/view/experience a moment.

A person carrying a HANDY or the like while traveling, eating, walking, working, driving (passenger), traveling, and otherwise living may record the embodied experiences of a moment (or interaction) with a video, song, menu, image, video, conversation, story, interactive moment element, or the like, tagged to a particular location and time. Interesting (suitable/desired) moment files may be located via both tangible and intangible aspects of a recorded moment (experienced/shared) by an in situ user by location, tagged object, and the like. Additionally, the context of a recorded moment may be searchable by time, location, type, mood (humorous, informative, poignant, opinion, historical, idio- historic, and others) and filtered by an in situ user (or remote users in special embodiments of the present invention).

In a presently preferred embodiment, the invention may work and employ virtual reality standards as they develop and are deployed such that objects/things and the like may be paired with a tagged location (message).

BRIEF DESCRIPTION OF THE DRAWINGS

The numerous objects and advantages of the present invention may be better understood by those skilled in the art by reference to the accompanying figures in which:

FIG. 8 is an environmental diagram of an embodiment of the present invention utilized in a museum or the like;

FIG. 9 is an environmental diagram of an embodiment of the present invention utilized in a retail store or the like;

DETAILED DESCRIPTION OF THE INVENTION

Figure 1:
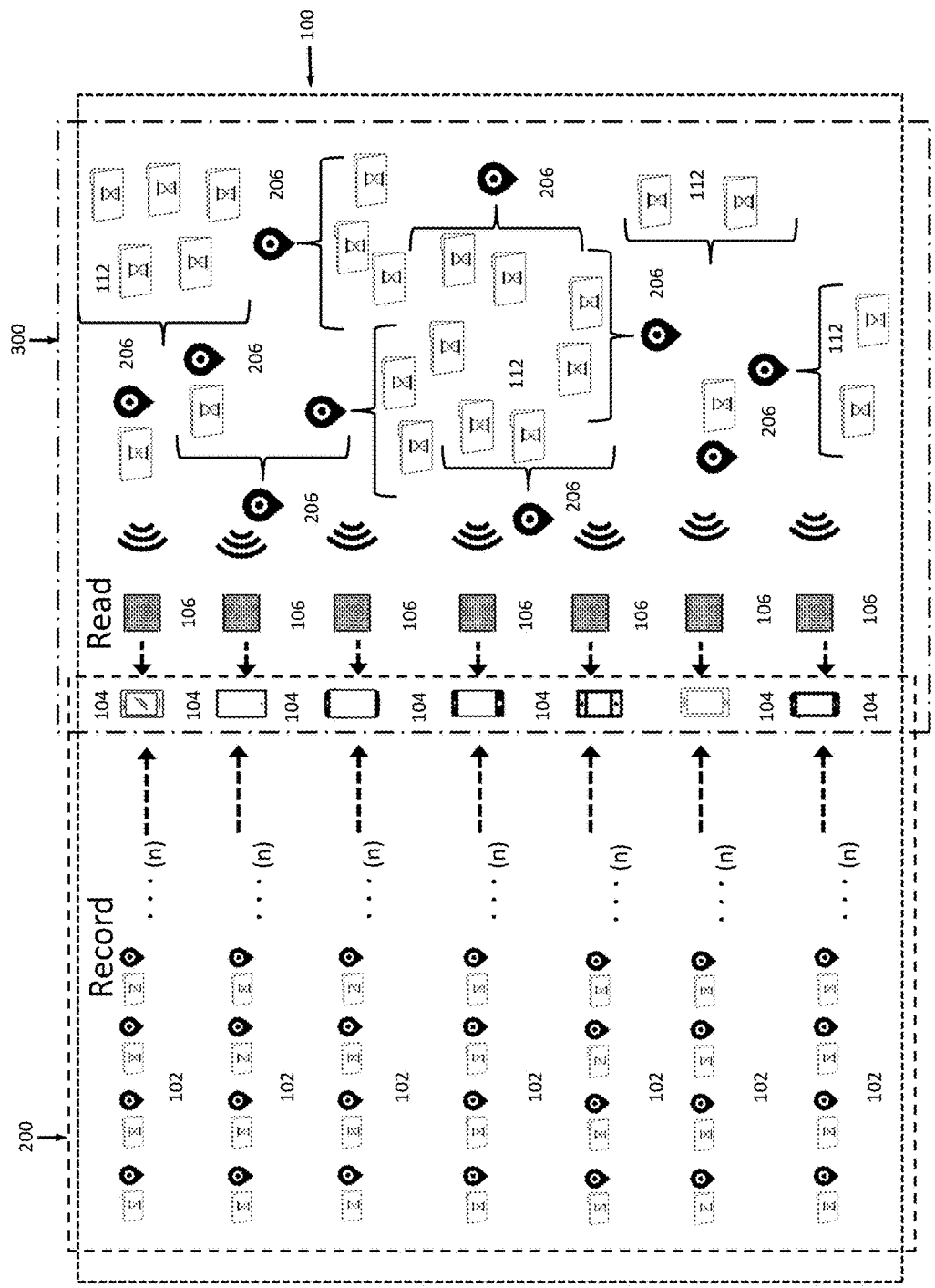
FIG. 1 is a highly diagrammatic environmental view of the moment recorder and reader network of an embodiment of the present invention.

Reference will now be made in detail to exemplary embodiments of the disclosure, examples of which are illustrated in the accompanying drawings.

The instant disclosure describes an apparatus, method, and system for recording moments 10 via a moment system 100. The moment system 100 includes a plurality of moment recorders 200 for recording moment files 10 to a server 108 (or the like). Each moment file 10 may include media 212 tagged with a time 204 and location 202. An embodiment may also include locomotion source 208 and theme 210.

Moment files are preferably associated with an object 122 or location 202. Users 12 may tag objects 122 and locations 202 to leave media 212 and the like for other users 12. The present invention allows users to filter, follow, share, inform, opine, and exchange ideas and moments 10 interesting to themselves and others.

Turning first to FIG. 1, a plurality of handies 104 (or the like) may be networked in an embodiment of the present invention for recording 200 and reading 300 moments 10 by subscribed users 12. Moments 10 are recorded 200 in a file 102 (on a server 108 or the like) tagged to a location 202 (object 122, place 206 or the like). Each moment 10 is created via a HANDY 104 or the like by directing the HANDY 104 to a place 206 (object 122, location 202) to record the coordinates and time 204. A user 12 may then associate the moment 10 with media 212. Moments 10 may additionally include tokens, games, instructions, memories, memorabilia, advertisements, and the like.

Figure 2:
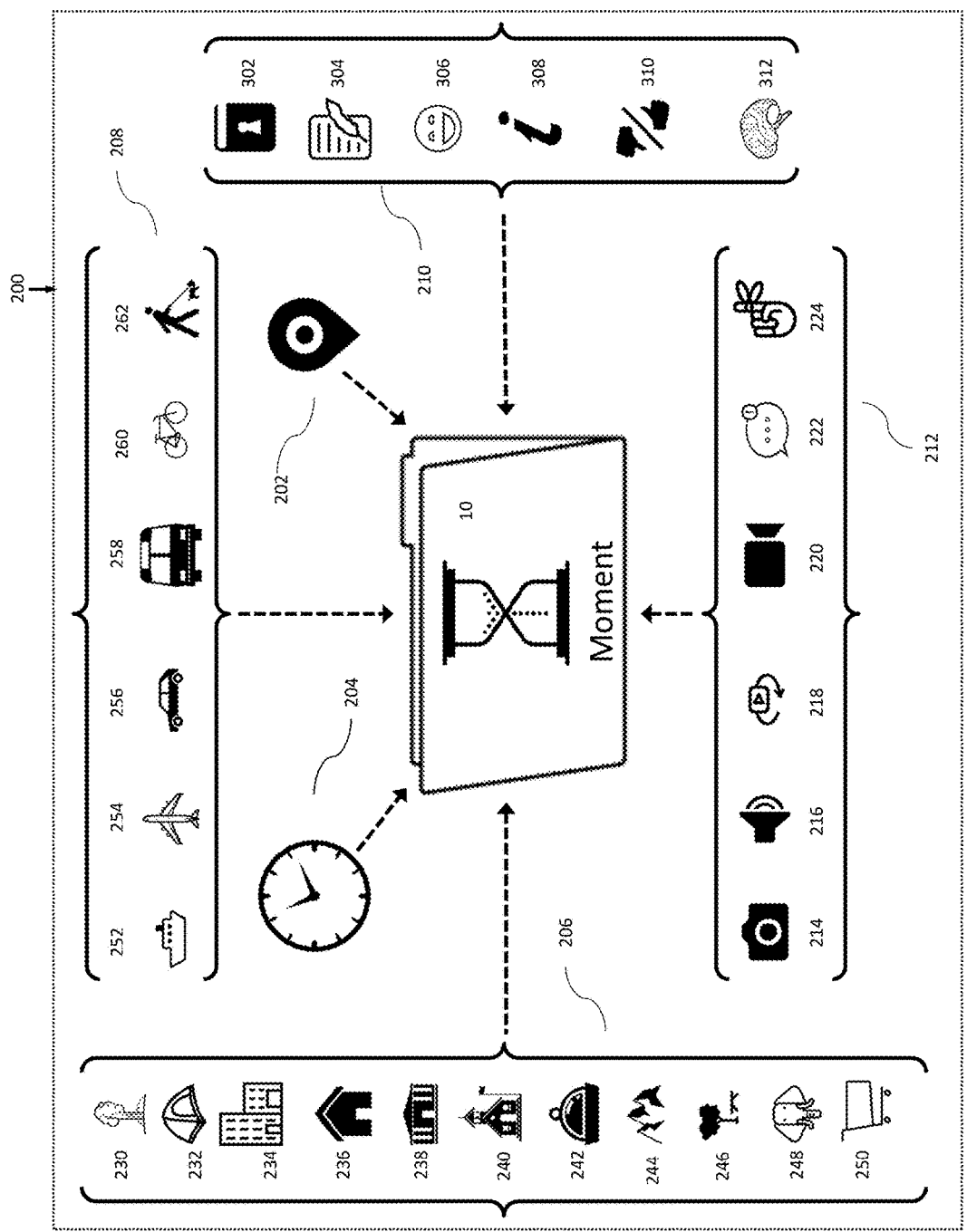
FIG. 2 is an environmental diagram illustrating an embodiment of a recording apparatus of the present invention.
Figure 15:
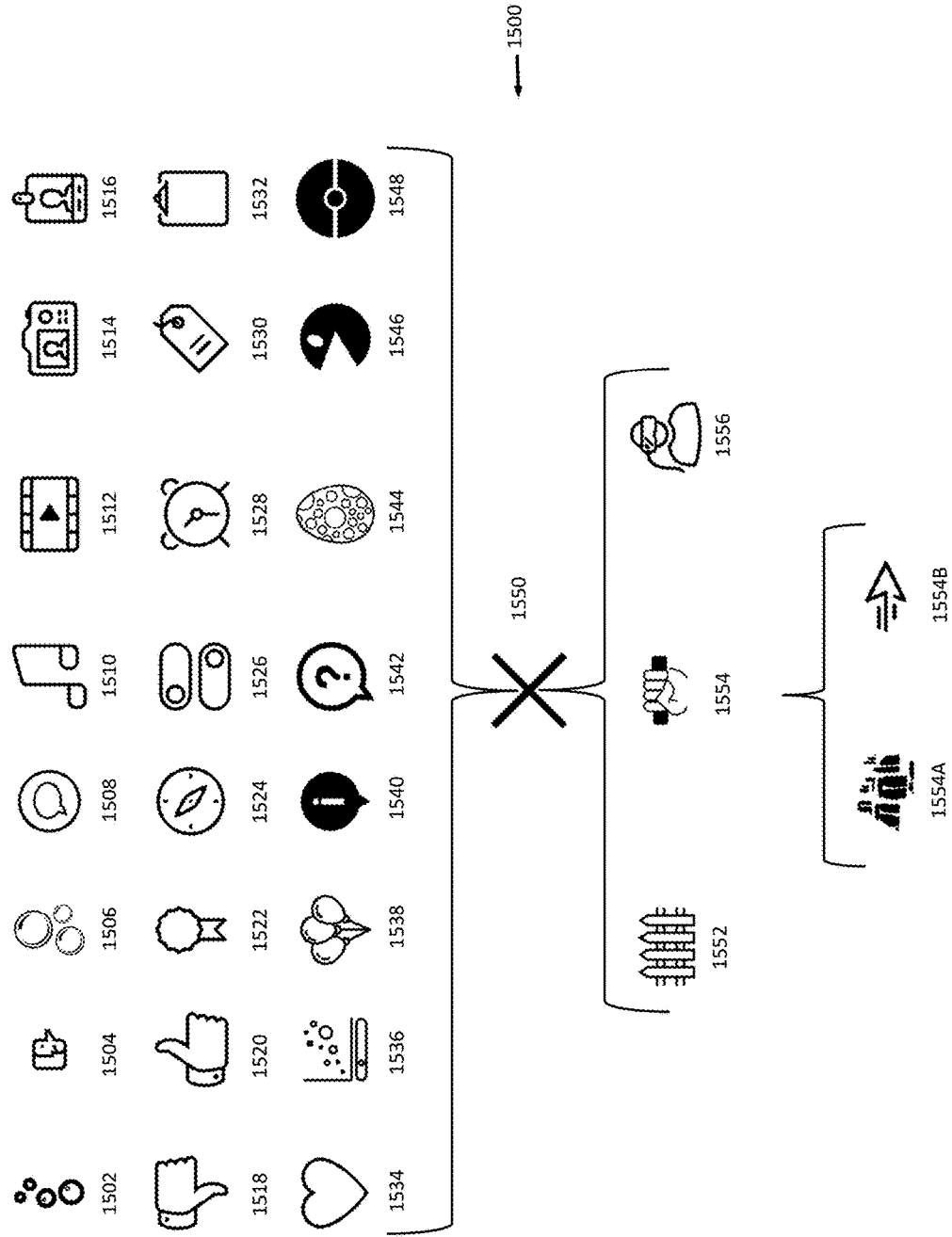
FIG. 15 is a highly diagrammatic illustration of a multi-dimensional moment file reader/recorder system capable of operation in both real, virtual, and augmented states where moment files may be categorized, accessed, and appended to real, augmented, and virtual objects.

FIG. 2 illustrates an embodiment of the system 100 of a moment recording system and apparatus 200 of the present invention. When activated, the moment recorder 200 records a location 206, or a series of locations in seriatim, for a moment 10 (or a series of moments) in, for example, a geographic coordinate system geodetic datum (WGS 84 or the like). The moment recorder 200 also records the date and time 204 for each location 206 in a moment file 10. Associated with the moment file 10 are additional classes of information (206, 210, 212, & 208) for providing multiple-dimensional-information 200 tagged and associated with and about a moment 10 (FIG. 15). For example, where the moment 10 was recorded while traversing a location in some means of transportation 208 such as a ship 252, airplane 254, automobile 256, public transportation 258, bicycle 260, or while ambulating 262, the method of transport is preferably associated with the moment 10. Likewise, where the moment takes place in an area 206, e.g., a national park 230, on a road 604 or sidewalk (trail 602), a campground 232, building 234, house 236, museum 238, school 240, restaurant 242, scenic area 244, city park 246, zoo 248, store 250, or the like, such information will be recorded 200 in the moment file 10. In a preferred embodiment of the recorder 200 media may also be associated (tagged) to a moment 10. For example, a picture 214, a sound or audio recording 216, a 360° video 218 or video 220, a text 222 or an image, a screen shot, a calendar entry, reminder 224, or the like. Also preferably associated with the moment 10 is context 210, or mood, or the like 108. For example, an embodiment may also record as part of a moment 10 a diary entry 302, a history 304, a feeling or mood 306, information 308, an opinion 310, or poignant anecdotes 312 or the like.

Figure 3:
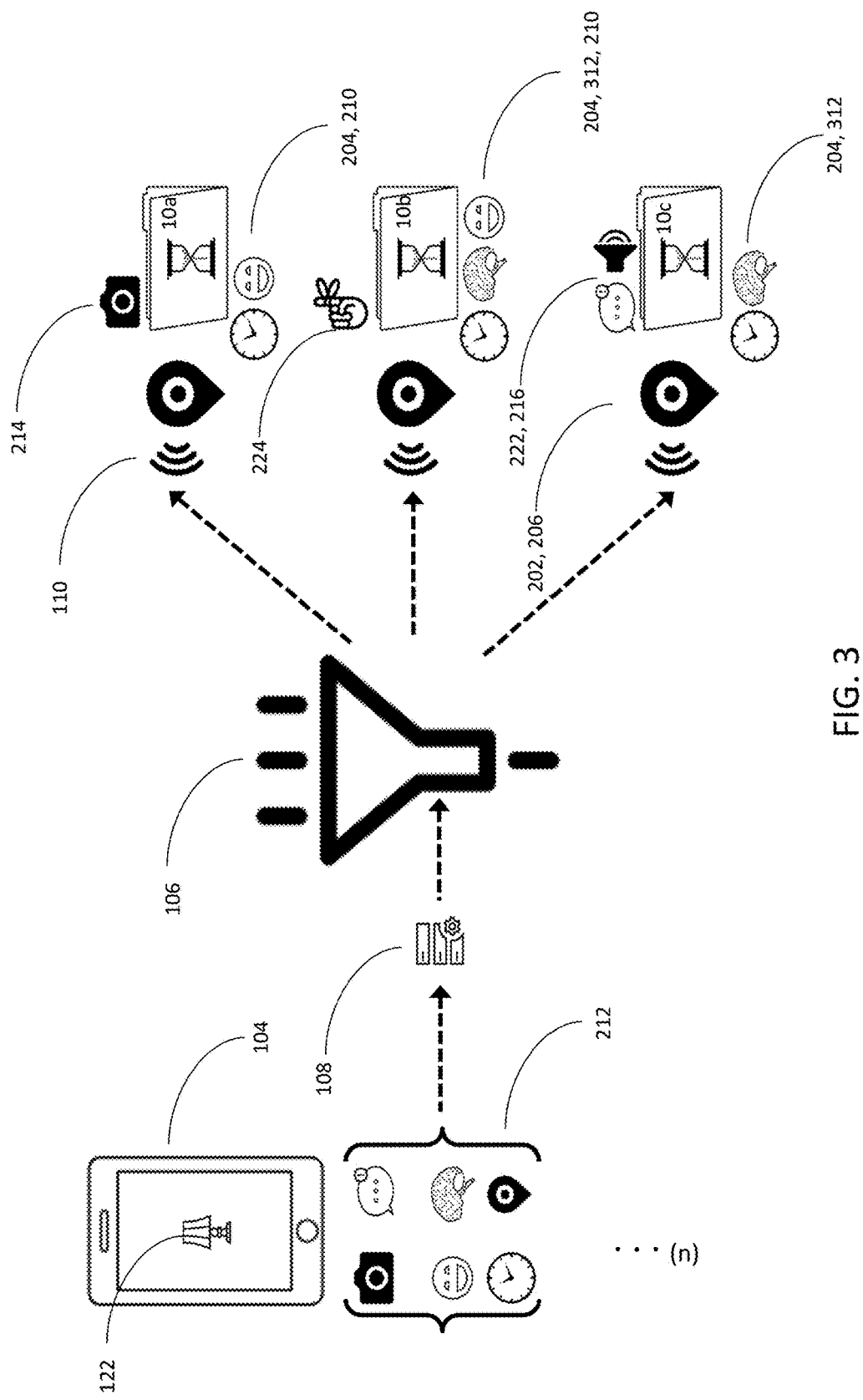
FIG. 3 is an environmental diagram illustrating an embodiment of a reader apparatus and associated presently preferred moment selection and filtration means of an embodiment of the present invention.

FIG. 3 illustrates a presently preferred method and apparatus for reading a tagged moment 10 (from a location 206 or the like). A HANDY 104 (camera) may be directed to, near, or toward an object 122 (e.g., a table lamp). A user 12 may then use the present invention 100 to tag the object and add content (206, 208, 210, 212) to be written with and associated with the object (and its location and/or time) to a moment file 10. The moment file 10 is, in a presently preferred embodiment, written to a server 108, via a network connection 110 or the like (the file may be restricted to a particular user 12 or user group). The moment file 10 may be stored and searched by an in situ user (and in some embodiments also a remote user) location and at least one of media 212, locomotion 208, location 206, and theme 210. Another user 12 with a HANDY 104 or the like may utilize a filter 106 or the like to restrict availability or reviewability of a moment file 10 in accordance with user selectable traits or preferences. Thus, a user 12 might select to have available moments 10 by location 206 and/or context. For example, a particular mood 306 or feeling 312, a type of object 122, a location 206, and/or media type 212. As a user 12 encounters an object they may point their HANDY 104 at an object 122, at a location 206, at a set of coordinates to review available (readable) moments 10.

FIG. 3, by way of example, illustrates three moment files 10a, 10b, and 10c. Moment 10a contains a photograph and describes a mood 306 (and time 204). Moment 10b contains a reminder 224, a time 204, a feeling 312, and a mood. Moment 10c contains a text 222 (description), a sound recording (song) 216, a time 204, and a feeling 312. All of the example moments (10a-c) may be associated with a single object 122 (lamp) at a particular location (e.g., a hotel lobby or the like), each created by different users 12, at different times, and readable 300 by one or more users 12.

A server 108 may contain an individual server, a universal server, a group server, and/or multiple servers providing connectivity to users 12 recording 200 and reading 300 via a network connection 110. The system 100 may provide users 12 access via a network connection 110 connected to a server 108 via a filter 106 (user selectable and controllable via, for e.g., an application driven menu or the like) associated with a reader 300 (HANDY 104).

Figure 4:
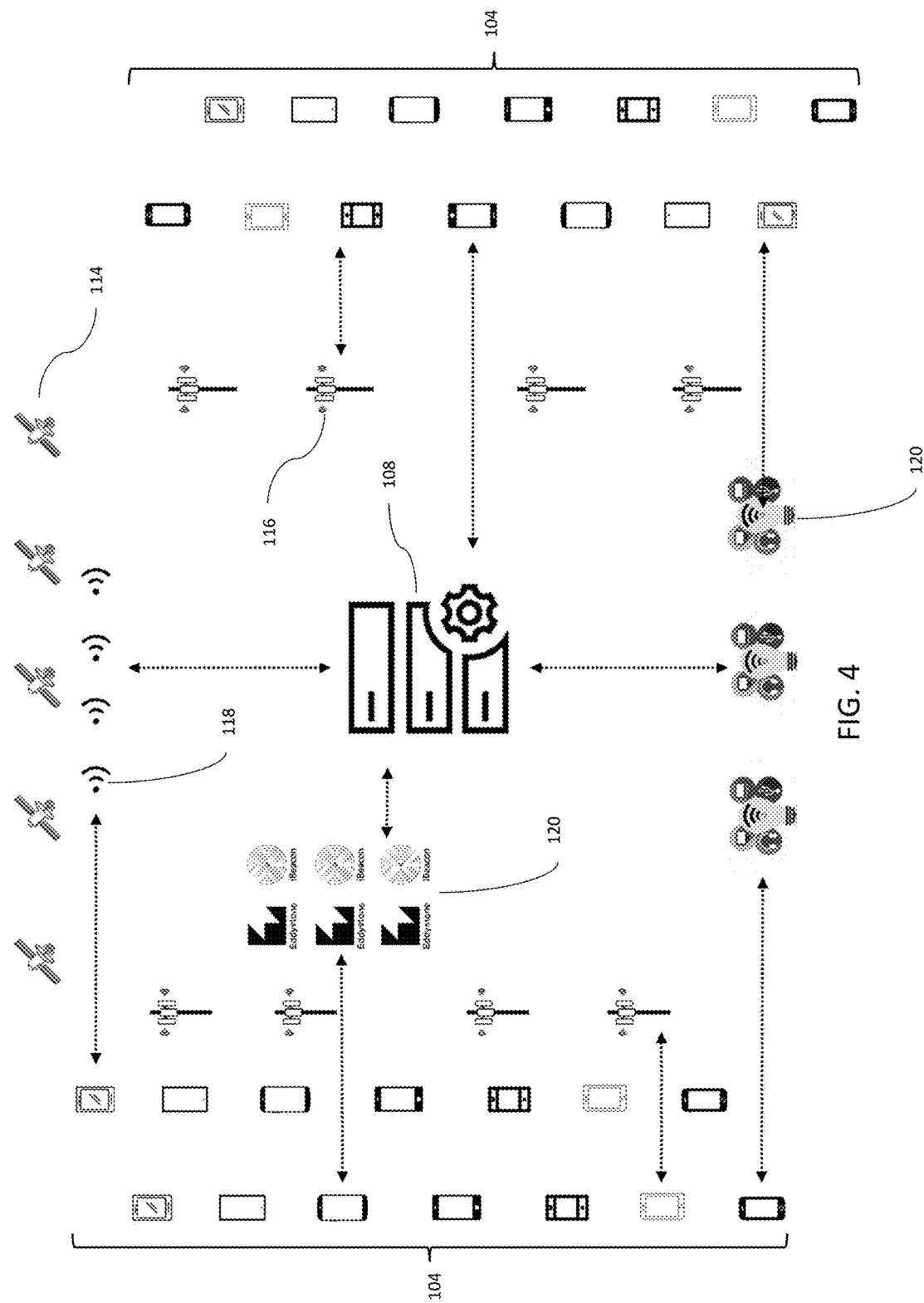
FIG. 4 is a highly schematic diagram of a location determination module of an embodiment of the present invention.

FIG. 4 illustrates a presently preferred network connection 110 schema for allowing recorders 200 and readers 300 of the system 100 to operatively connect with the system to record 200 and read 300 moment files 10. Preferably the system 100 may be utilized both in and out of doors. By way of illustration a plurality of handies 104 may be connected to a server 108 via a cellular network 116 (when available) and have consistent and reliable location information 114 via a GNSS system or the like. When a cellular connection 116 is unavailable, WiFi or Bluetooth 118 may be utilized to provide both connectivity 110 and user 12 location information 114 (triangulation, multilateration, or the like). LiFi 120 and other indoor location and connectivity systems may also be utilized (Eddystone, iBeacon) to provide robust system 100 connectivity 110 for both recording 200 and reading 300.

Figure 5:
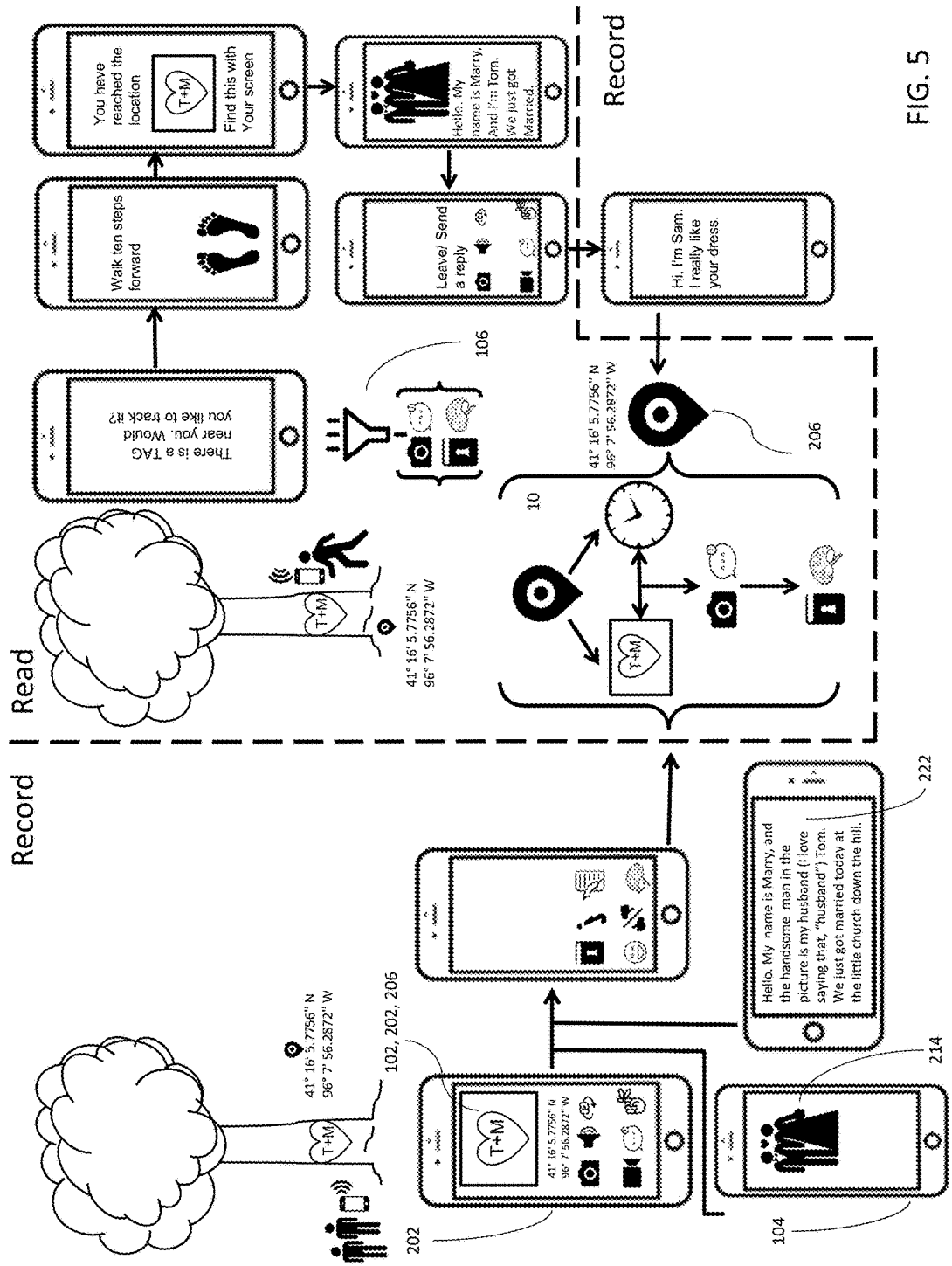
FIG. 5 is an environmental diagram of an embodiment of an example of a moment location tagging aspect of an embodiment of the present invention.

FIG. 5 illustrates a presently preferred means of utilizing an embodiment of the present invention. Users 12 may record 200 a heart and initials virtually or actually carved into a tree. The object (carving) may then be associated with their initials (and other media) virtually into a tree. Users 12 may decide to capture the moment using aspects of the present invention 100. Using handies 104, tagging a particular location (longitude and latitude) of the tree, a reference object, i.e., heart carving. Users may then select to leave a picture 214 and a text 222 in the moment file 102 attached with the paired location-object (tree-heart). Selecting a message type may also be provided, e.g., a feeling 312 and/or diary 302. After the passing of time another user 12 nearing the tagged location (tree) with appropriate filter settings (appropriately selected filter preferences or viewing authorization) may be informed of a nearby moment 10. The moment may be read 300 or ignored. If it is to be read, shared, an embodiment may tell a user 12 how many of their steps (and in what direction) the recorded moment 10 resides. Upon following a set of instructions the tagged object and moment 10 may be read 300. This and subsequent users 12 may comment on the original and subsequent moment with a new moment 606. A different media may be utilized, and a reply may be sent to the original recording HANDY 104.

Figure 6:
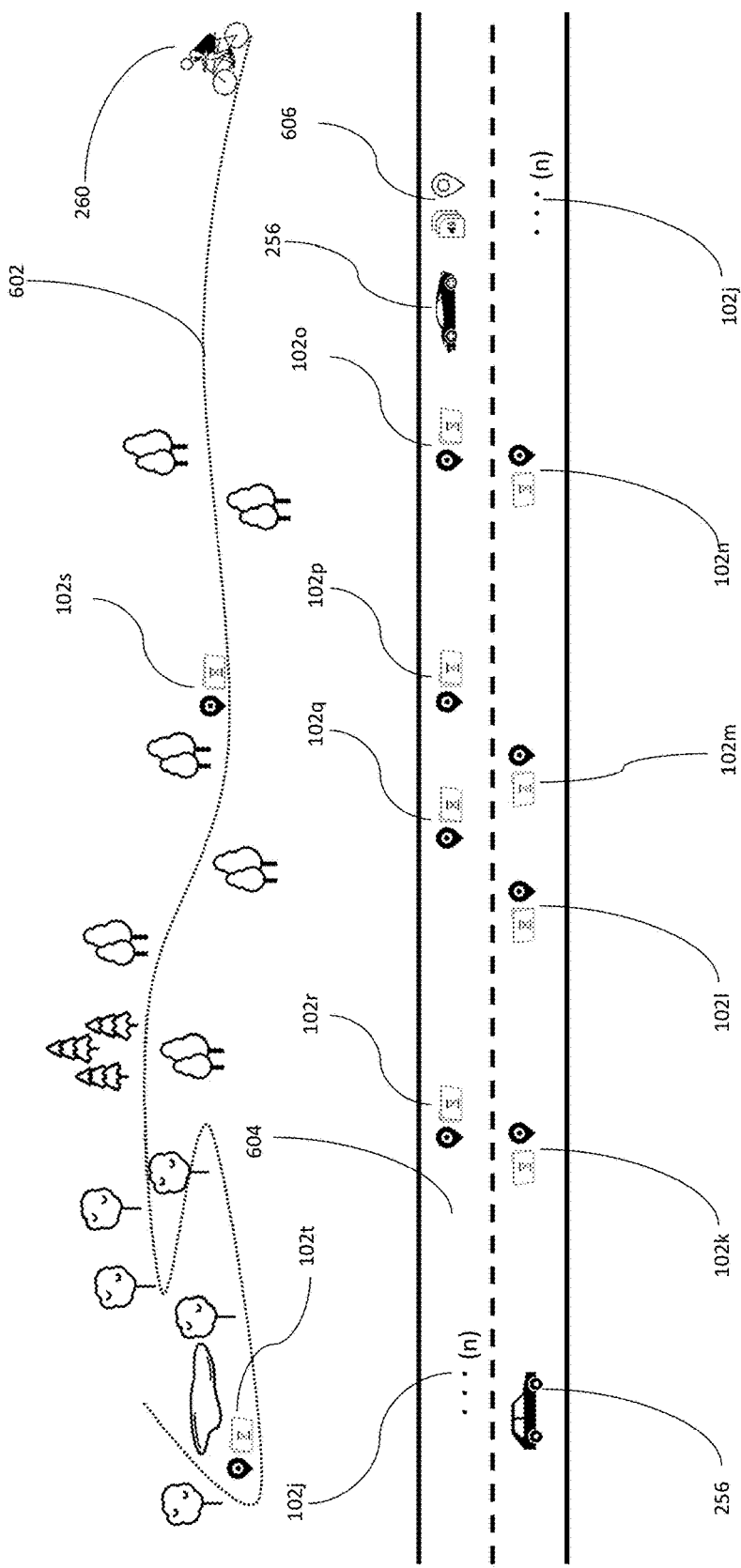
FIG. 6 is an environmental diagram illustrating an embodiment of a locomotion-based embodiment of an aspect of the present invention.

FIG. 6 illustrates an embodiment of the system 1000 for utilization while moving 208. In operation a user 12 may leave a string of moments 102k-102t along a travel way 602, 604. A user 12 in a vehicle (or walking 262) may both record and read moment files along the path. For example, a plurality of photographs 214 (album covers) and songs 216 might be left as a playlist for reading (watching/listening) by a user traveling (in a vehicle 260, 256 or the like). Member users 12 and the like may subscribe to a single or various recorders for listening and viewing the travels and travel interests of a person (recorder) they follow via their filter 106 (blogger/disk jockey). Likewise a plurality of photographs or video snippets may be left showing scenic areas along a route during different seasons or conditions. Additionally, a recorder may record commentary or opinions as in a travelogue or the like. Other's, following a particular author (travel writer/blogger) may obtain a more complete and fulfilling travel experience. Furthermore, children and the like may experience the commentary of past travel (e.g., a travelogue) recorded moments 10 of a parent (family member or friend) along a particular route. Moment archeologist of the system 100 may track, write histories, study, promote policies, predict future interest, and the like.

Figure 7:
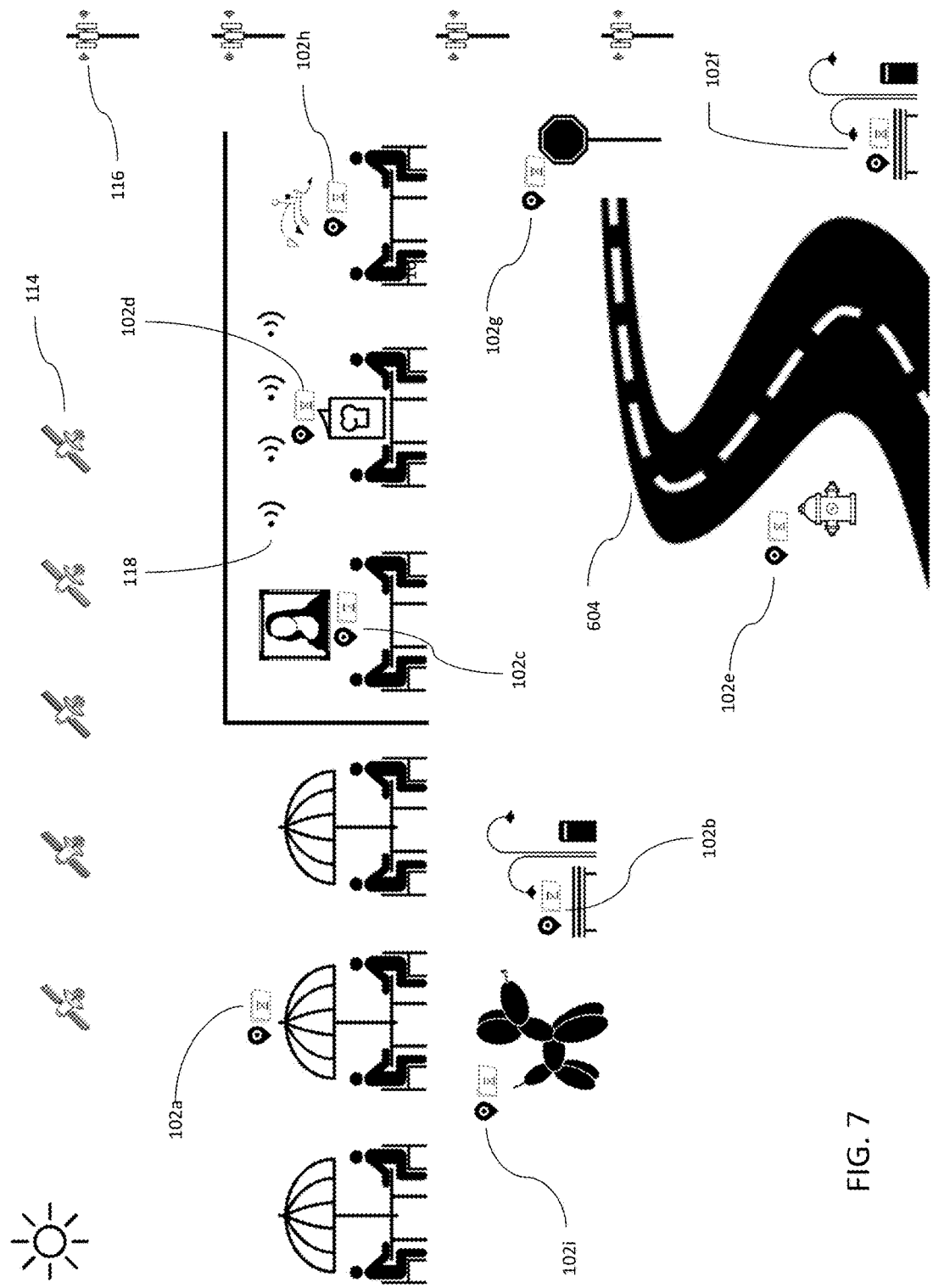
FIG. 7 is an environmental diagram of various aspects of an exterior and interior utilization of an embodiment of the present invention.

Turning now to FIG. 7, a moment 102a may be recorded at an outdoor table at a restaurant or café memorializing a moment via a particular medium or collection of media such that another user 12 may experience or enjoy a particular aspect saved 200 by another user 12. In an indoor table a user 12 might read 200 (or record 300) a moment 10 regarding an object such as a painting 102c. The user's 12 HANDY 104 (or the like) may provide location and connectivity via a wireless network 118. Additionally, a user 12 may opine 310 regarding a menu item 102d or menu, or meal, or the like. Information 308 regarding a particular locus in quo may also be shared via an embodiment of the system 100 of the present invention. Some locations including interesting objects, such as a sculpture, thing, or the like 102h, which may warrant a comment or moment 10 of interest to other users. Outdoor venues may also include objects to be tagged with a moment 10 such as an outdoor sculpture 102i, bench 102b, hydrant 102e, sign 102g, or the like. Location data may be derived via a GNSS network 114 or wireless network 118, or the like.

Figure 8:
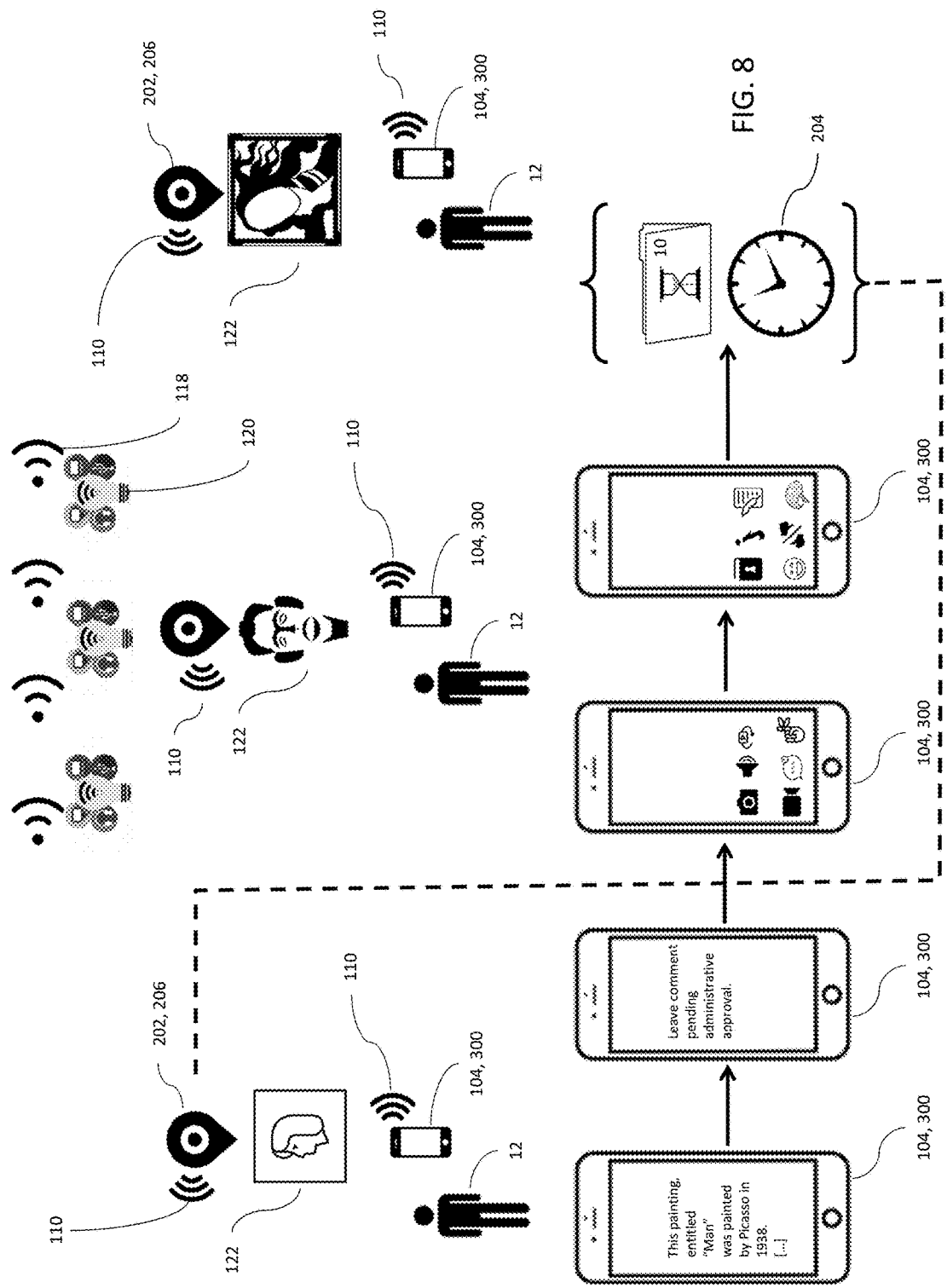

FIG. 8 illustrates, by example, the utilization of an embodiment of the present invention 100 in a museum. Users 12 may leave tagged moments 10 associated with art objects 122 containing editorial, opinion, and informational media or the like. WIKIPEDIA® like articles, encyclopedia entries, and the like may be appended to or be part of a moment files 10. Likewise, content created by the system 100 may blend moment file 10 content to form moment file 10 abstracts of a particular location or thing of interest. Additionally, a professional, such as a curator may leave moments 10 near objects 122. These professional comments (moments 10) may be commented on by other users 12 and shared within a small group or the like. In a preferred embodiment an administrator may first approve or reject moments 10 left within a geo-fenced area (around an object, within a facility) or the like. In this fashion, an authority may control the type of moment's readable/recordable. Likewise, paid moments 10 may be left on or about a facility tied to a particular activity 208 or object 122. Other monetization schema may also be employed, e.g., a subscription to the recordings of a particular recorder 12. A filter for filtering all commercial moments 10 may also be available for a subscription requiring a set number of recorded moments 10 over a particular period of time (or a small pecuniary fee). Subscription revenue (in at least one embodiment) may be wholly or partially distributed to an appropriate holder 1006 in the form of reduced fees or the like. Highly desirable moment content 10 may be associated with a brief, a paid announcement, or the like.

Figure 9:
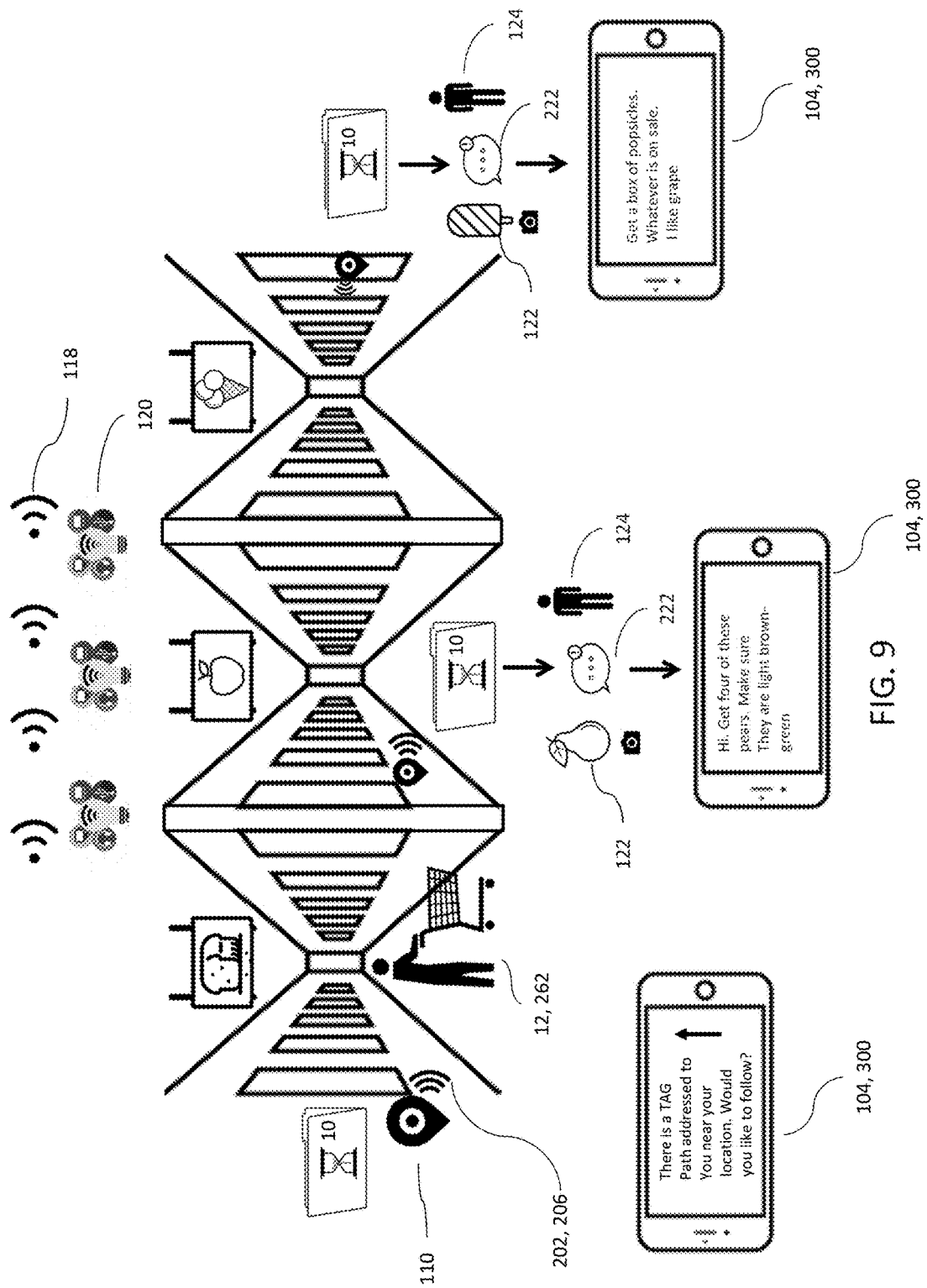

FIG. 9 illustrates an embodiment 100 of the invention in a retail environment. A user 12 might leave a plurality or moments 10 near and associated with grocery items and the like. A user desiring to make a particular recipe or the like might follow a plurality of moments within a grocery store or the like to purchase the correct or desired items. A virtual shopping list may be created containing other suggested items necessary to fabricate a particular dish or the like. A significant other might leave shopping instructions for their partner. Likewise, coupons and discount related information might be interactively obtained by users 12 through moment files 102 of an embodiment of the invention 100. This provides vendors, product placement managers, marketing/advertising professionals, manufacturers, and storeowners to require proximity both in space and/or time to obtain a desirable moment 10. For example, at 8:00 AM a store might be otherwise in need of shoppers on any given day. In order to drive traffic into a store (venue) a scavenger hunt (breadcrumbs, spoor) contest or the like might be utilized to provide discounts or prize type interests for shoppers.

Figure 10:
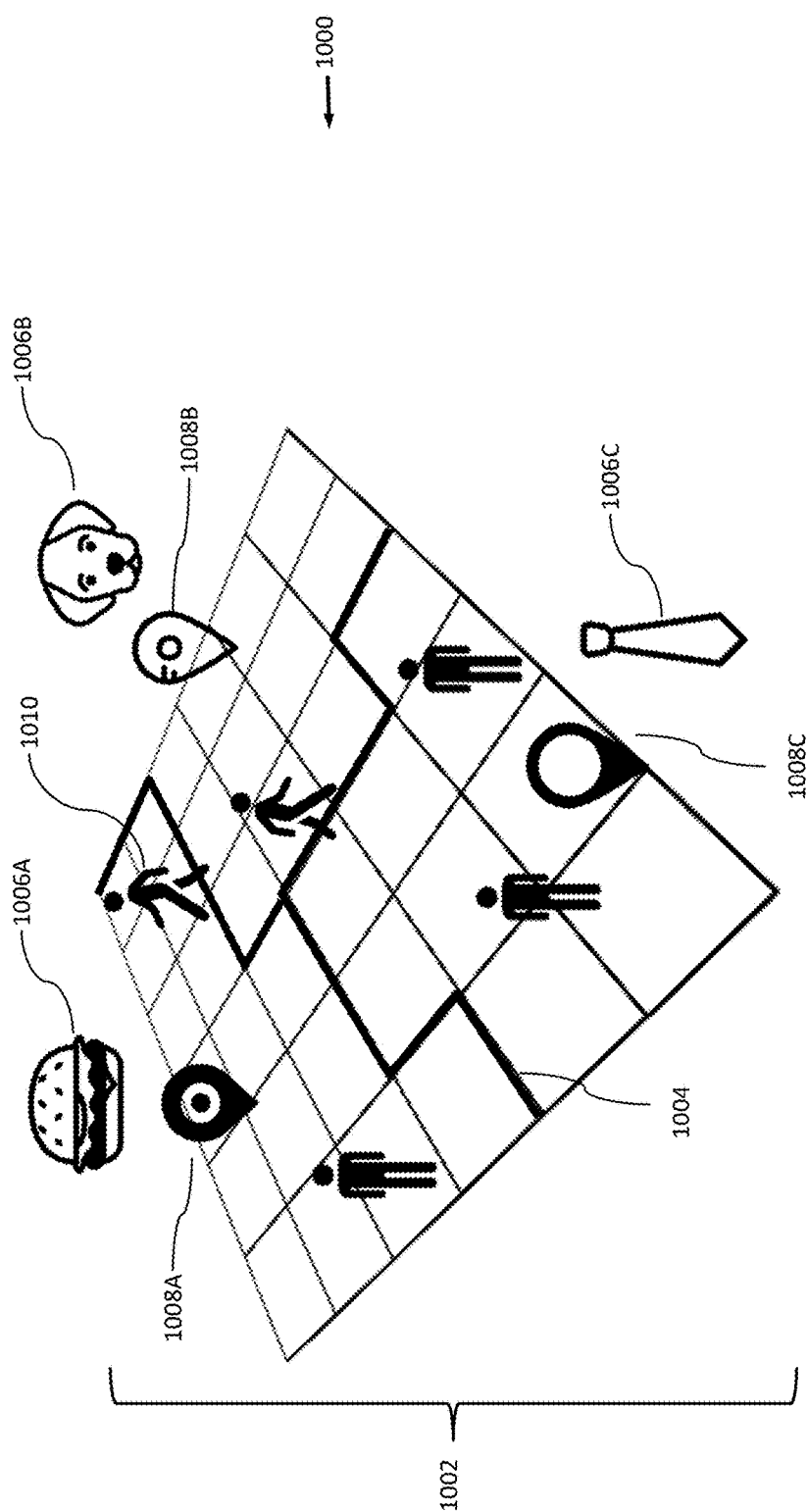
FIG. 10 is a highly schematic representation of an augmented property ownership (control) system for providing a rule of law based augmented property environment.

FIG. 10 illustrates an augmented property map 1002 based upon real property boundaries or virtual boundaries 1004 in accordance with at least one embodiment of the present invention 100. Users 12 may identify, price, bid on, purchase, negotiate, trade, rent/lease, borrow, and the like a parcel of augmented property 1000. Additionally, an owner/holder 1006 of a parcel of augmented property 1000 may restrict use and or prevent trespassing users 12 and their associated moment files 10. Moments 10 may only, for example, be left, accessed/enjoyed, and/or seen (visualized by a particular user 12) as provided by the system 100 (in at least one embodiment 100).

In one embodiment users 12 gaining access to a particular location 202 by being physically present in the location may receive some haptic response (ping) originating from the system 100 to a user's 12 HANDY 14, or from a holder 1006 interested in separately interacting with a particular user 12 reading/recording 300/200 a moment file. A virtual property ownership system 1000 may include an augmented (virtual) map 1002 augmenting real or contrived boundaries 1004 such that an owner 1006 of augmented property may monetize system 100, users 12, moment file 10 recording/reading 200/300. Augmented property holder 1006 identification may be designated with a holder 1006 moment file 1008 which must be accessed/played or the like in order for a user 12 to record or read a moment file 10. In one embodiment a user moving 1010 across a boundary 1004 into another holders' 1006 augmented property may be (or may not be) required to access the crossed into holders augmented property moment identification moment file 1008. A user's 12 time within an augmented estate, and/or number of previously viewed user holder based content moment files 1008, may modify the content of a holders' moment file 1008 so as to present either full, abbreviated, or no moment file content to said user.

Figure 11:
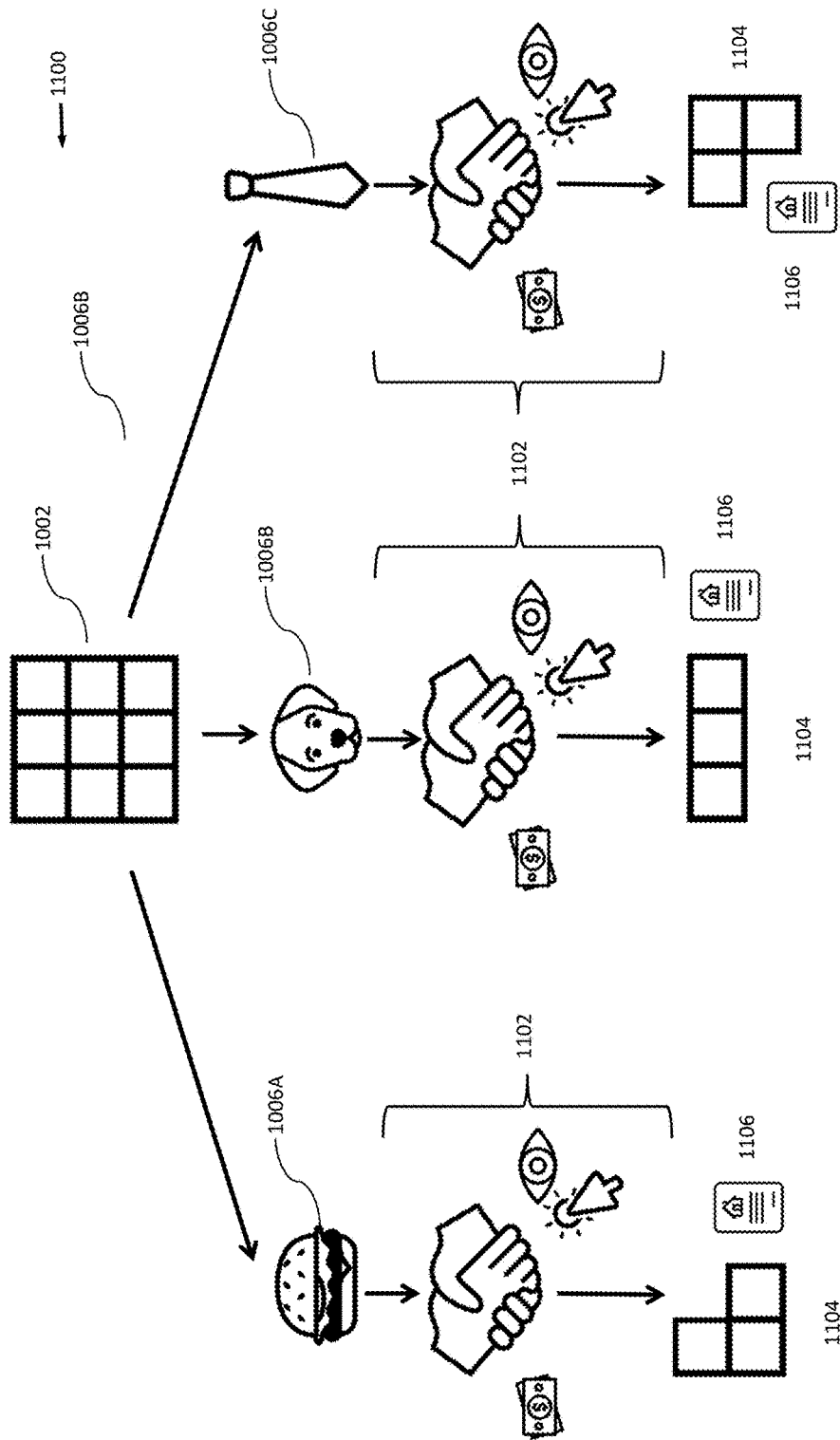
FIG. 11 is an augmented property purchasing flow diagram illustrating means for hypothecating, deeding, owning, obtaining, and divesting augmented property according to a rule of law based system.

FIG. 11 illustrates a currently preferred process for transferring augmented property in accordance with the system 100 of the present invention. The purchasing process 1100 includes an augmented property 1002 divisible temporally, by user population, by clicks, acreage (square meter), onerousness of holder moment 1008 content, by value and frequency of chits or coupons provided to users, coupon downloads, user traffic, and user feedback. Holder 1006 control over augmented property may be limited to actual real property ownership, fee simple, fee tail, temporal estate, lease, or license. An agreement 1102 may be utilized to describe terms and conditions incumbent on a purchasing holder's utilization of the augmented property 1104. Augmented property deeds 1106 may be freely or restrictedly hypothecated or traded in accordance with the agreement 1102.

Figure 12:
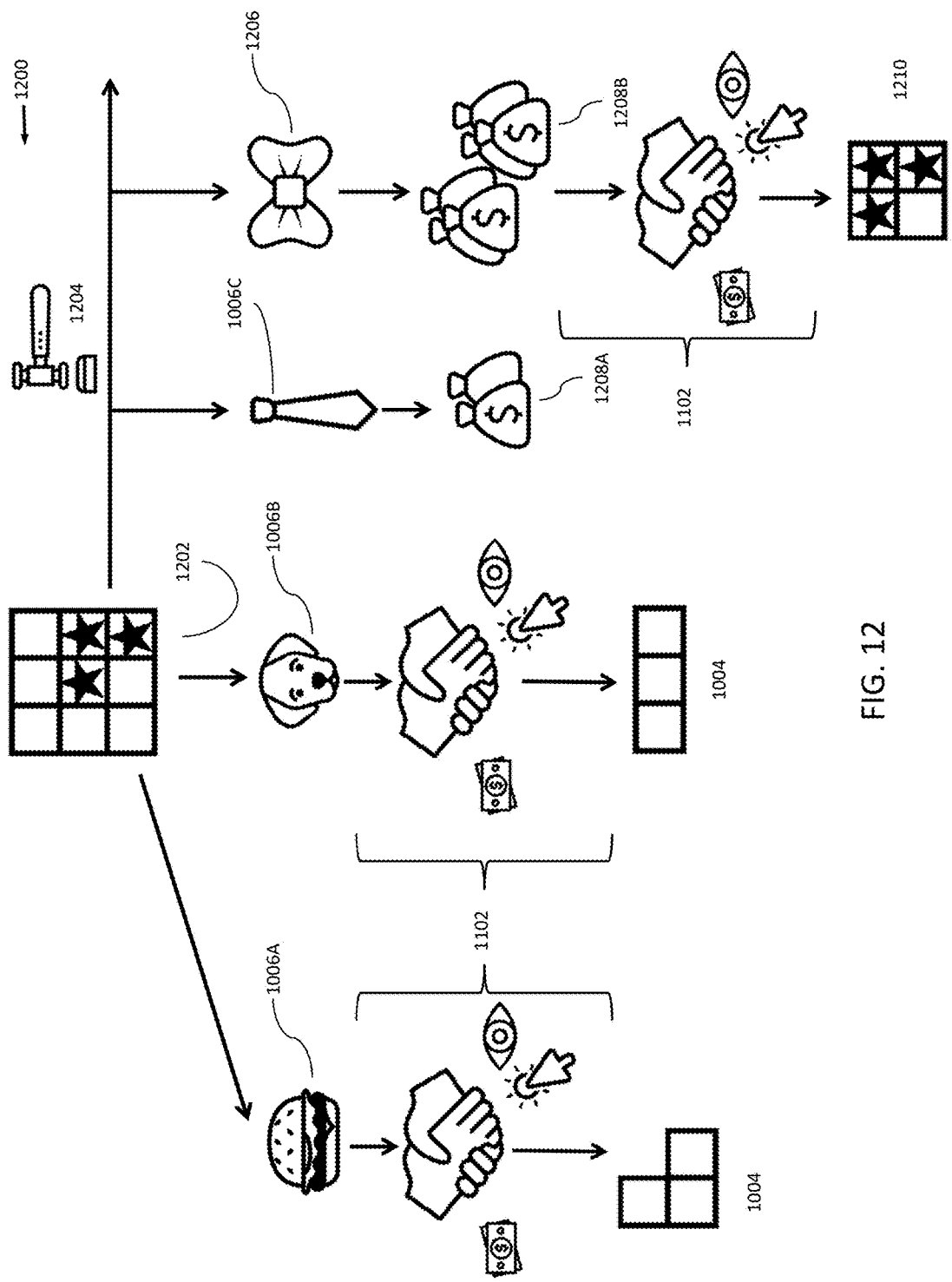
FIG. 12 is an augmented property auction flow diagram illustrating a means of monetizing an embodiment of the present disclosure.

Turning now to FIG. 12, an auctioning system 1200 for prized augmented property 1202 or a plot of augmented purchased property 1210 in an auction 1204 facilitated by the system 100 in accordance with auction standards (minimum bid, absolute, and reserve or the like). Competing bidders 1206 may combine interests, divide interests, and otherwise negotiate terms in accordance with the system 100 auction system 1200 rules. Rules may be set forth in a system moment file 10 accessible to interested parties to the property 1202. Disputes may be decided via arbitration, a rating system, or the like. Funds 1208 may be distributed partially or fully to users providing moment file 10 content based upon user recorded moment file 10 ratings, views or the like. The funds 1208 may also be distributed by the system 100 to users who access/read moment files 10 located in augmented property 1202 in the form of coupons or chits. These coupons or chits may be underwritten back to the holder 1006 by the system 100 in the form of reduced lease, rent, click, or property holder maintenance fees (or the like) payments to the system 100.

Figure 13:
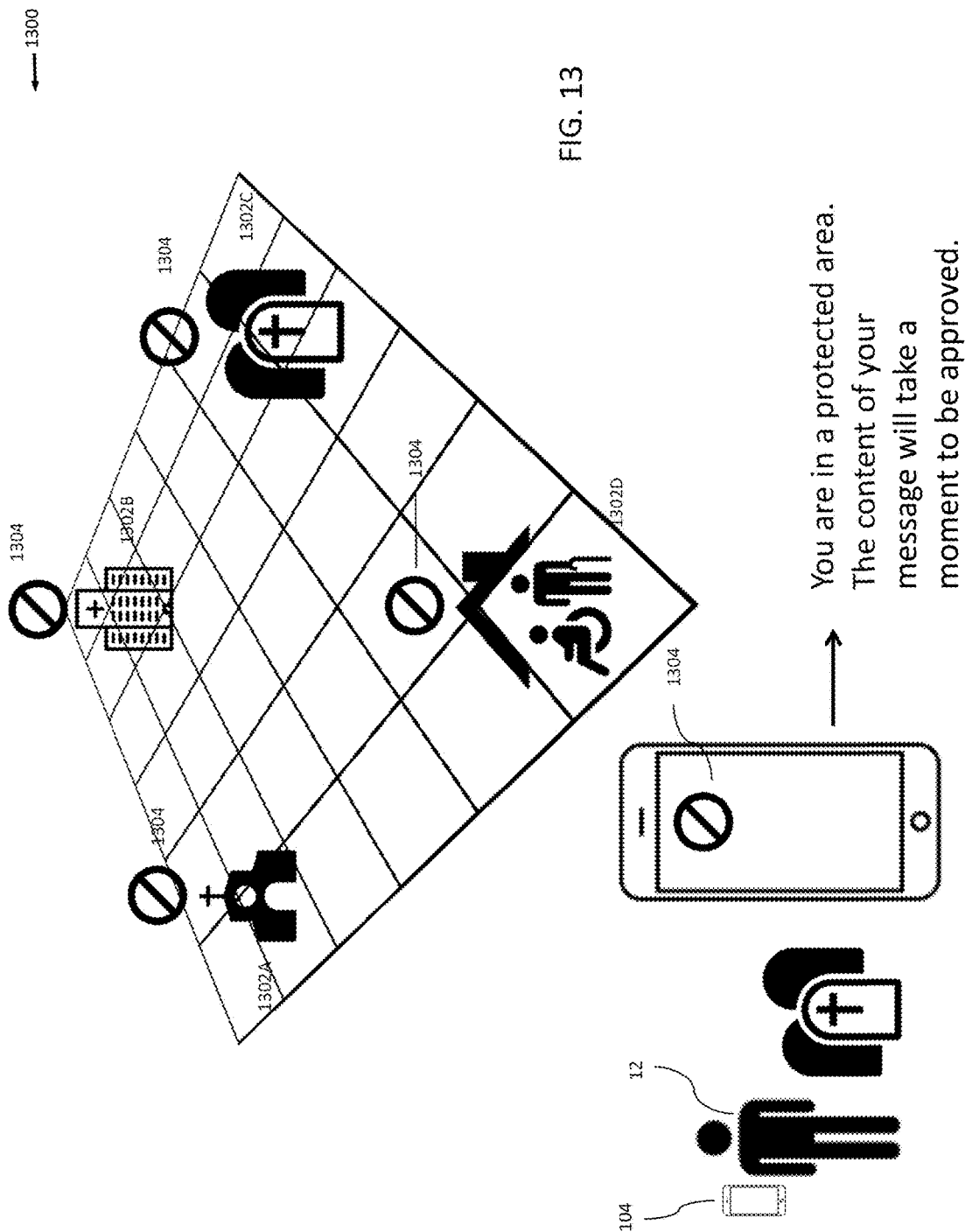
FIG. 13 is an environmental diagram of an augmented estate geo-fencing system of an embodiment of the present disclosure.

FIG. 13 illustrates a feature of an embodiment of the present invention restricting moment file 10 content recording or reading (viewing) within a augmented geo-fenced area 1302 (churches, temples, cemetery, schools, and the like). Holders 1006 may also purchase and then prevent all moment file 10 recording/reading 200/300 within the boundaries 1004 of their augmented property. Real property holders may seek condemnation (eviction) from the system 100 of an augmented property holder's 1006 interest, which is within the boundaries of the real property holder's estate.

Figure 14:
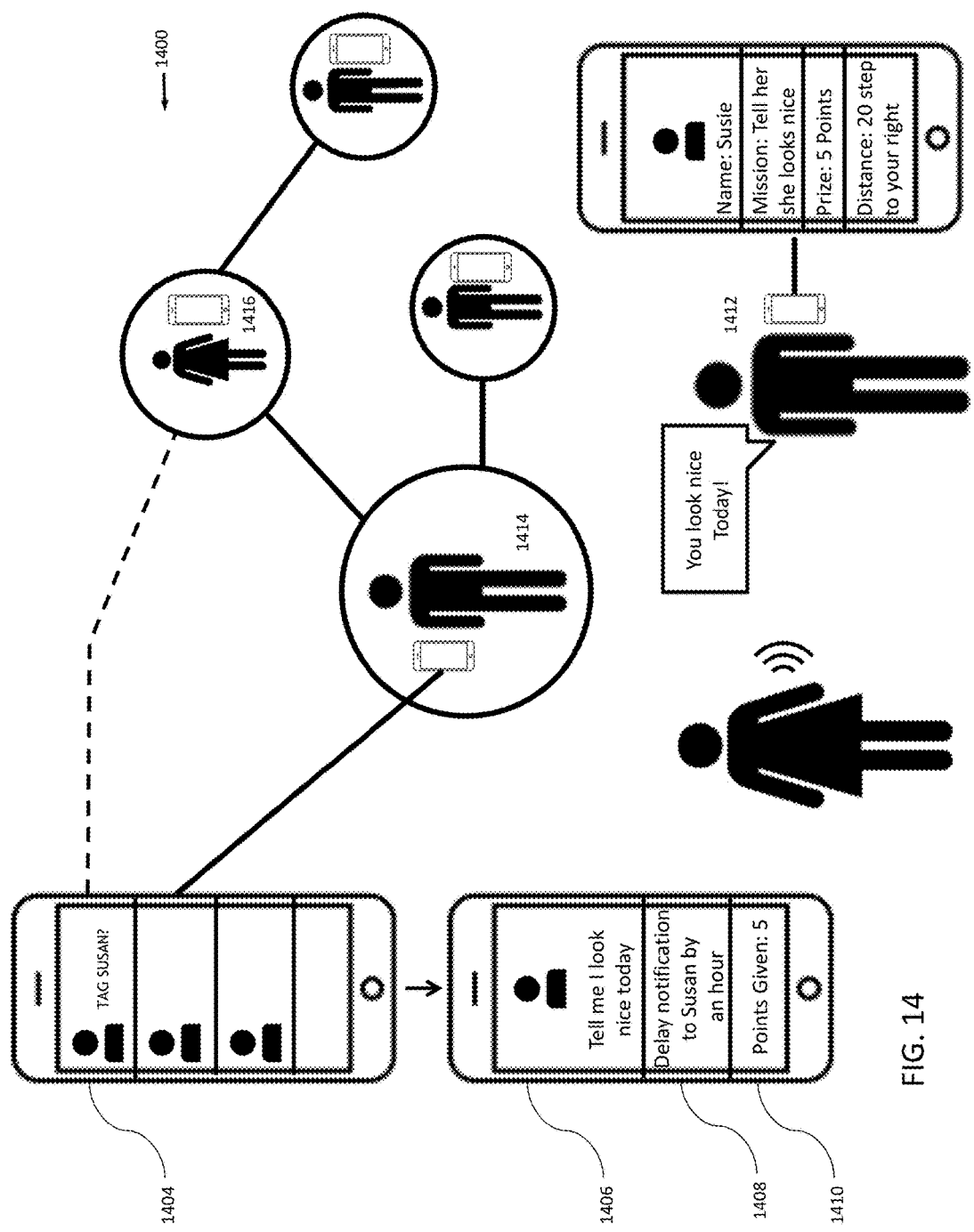
FIG. 14 is an environmental diagram illustrating an embodiment of the present disclosure capable of tagging moment files to a personal object (HANDY or the like) periodically moving with a user.

Turning next to FIG. 14, the system 100 may allow user's to tag other users with moment file 10 content. The system may allow users to restrict moment file 10 content recording on the HANDY 104 location of another user (or the like) by group, content type, or the like. Generally, it is an object of the present invention to allow system 100 users 12 to control (restrict) moment files 10 posted about them, around them, on their property, by a particular user, group of users, and to otherwise restrict their participation with the system 100 and its users. Such restrictions may be free to users by moment file category, other user identity, moment file content, or the like (hate speech, speech designed to hurt a user or non-user, bullying, unwanted interactions, stalking, and the like are preferably controlled via the system 100 filter 106. Other acceptable but undesirable moment file 10 content may be restricted by (1) user participation level (higher utilization, measured, e.g., by moment file quality and content), or (2) by subscription. Users 12 may also control and designate members within their group, when and where they wish to be reminded of an available moment file 10 (do not notify [ping] while driving, at night, at work, in the theater, or the like). Users 12 may limit the radius of their interest to certain types of locations, users, geography, and the like.

Turning now to FIG. 15, a user interface for a multidimensional platform of the invention 100 (or the like) is illustrated. User interface icons 1500 may be displayed on a device such as a HANDY 104 (herein various HANDY 104 icons throughout the appended figures also signify fixed vehicle displays or heads-up-display (HUD) or the like), capable of operation in the system 100 as at least one or both of a moment recorder 200 and/or a moment reader 300.

Sample user interface icons 1500 for display 104 are preferably representative of moment content or subject. Users 12 may selectively sort, arrange, and categorize moments 10 (FIG. 2) they have read 300 or recorded 200. Additionally, the system 100 may provide sorting and categorization (e.g., FIG. 2 or the like) according to desired system 100 outcomes. For example, increasing usability, user participation and interest, according to a particular property holder's 1006 interest, or in accordance with some useful social goal (e.g., awareness of laws, dangers, and restrictions or the like). FIG. 15 illustrates an example sample set of moment icons 1500 for an embodiment of the present invention. For example temporary moments 1502 may be available to be read 200 (displayed and accessible) for a particular singular period of time or for a brief period of time on a reoccurring or randomly reoccurring basis according to a user 12, system 100, or holder 1006 goal. Additionally, moments 10 may signify an opportunity to chat 1504 with another user 12, the system, or a holder 1006. Moments 10 may also be grouped into families' or by category as signified by a single moment 10 user interface icon 1500. Such groupings may be established according to a particular user's 12 interests, by age, game playing field (serial or intersection game board tile/space) in an augmented reality user 12, holder 1006, or system 100 designed and/or administered game. For example, a requirement that a user 12 follow a particular path solving or achieving certain physical, mental, advertiser, or social tasks in order to achieve a particular goal (see, for example, FIG. 16). In another embodiment a key/password 1508 accessible moment 10 category may require an accomplishment or the like to obtain access to a moment 10. In such an embodiment or the like, sound 1510 moments 10 may be identified and characterized as containing a voice message, musical recording, or the like. Video or movie based moments 1512 (see also 218, 220 FIG. 2) and photograph based moments 1514 (see 214, FIG. 2) may also include a special interface icon 1500 moment file 10 designation. Users 12 may also design and utilize customized icons to designate their moment 10 content (an avatar or the like). Such customized icons may be available according to specified system 100 rules and or parameters.

FIG. 15 also illustrates other categories of sample moment 10 content which may or may not be available to all users 12. For example, a user 12 may be tagged with a moment 10 icon 1500 representing a personal message 1516 relevant to other users 12 or the like. In an operating embodiment of such a system 100, a user's HANDY 104

(vehicle or the like) might include an icon signifying some aspect or reputational value of such a user 12. Such a tagged user 12 might be tagged with a moniker or representation either positive or negative. Perhaps a particular user is a poor driver or doesn't obey traffic laws and or etiquette. In such a case they may be visible via a reader 300 of the system 100 wearing (designated by) a particularly designed icon 1500 representing a negative characteristic, e.g., titterer, speeder, thrasher or flamer, and the like; or a positive characteristic, e.g., expert, arbitrator, banker, employee, friend, redeemer, repairperson, troubleshooter, or the like. In one embodiment such a tagged user 12 could remove the tag only after demonstrating to the system 100 ameliorating conduct or the like (e.g., consistently obeying traffic rules, system 100 verified walking an area full of litter and then depositing the litter at a known refuse container or location). Likewise, positive monikers (tags) might be earned via ratings, moment recordings, training, and/or other system 100 designations or assignments. User location data may be required by the system 100 in order for a user to participate. Network-based, GNSS-based, handset-based, SIM-based, WiFi based, Vehicle to Vehicle (V2V), Automatic Vehicle Location (AVL), (local.iteris.com/cvria/html/applications/applications.html), or other and/or hybrid based HANDY (vehicle) 104 location tools may be employed.

As previously described in the description of FIG. 2, opinions 310 may include a negative content 1518 moment file 10, and/or a positive content 1520 moment file 10. Users 12 of the system 100 may also achieve a moment file 10 generated by another user 12, a holder 1006, or the system in a location a user is known to frequent which awards the user 12 with a designation or chit or the like.

In other embodiments of the system 100 (FIG. 15) a user 12 may leave directions 1524 or allow a user to turn system 100 features ON/OFF by accessing (reading 300) a system menu 1526 moment file 10. A user's reputation 1530 (biography or the like) may be designated via an icon 1530 worn about a user in the augmented reality of the system 100. Some moments 10 may be time sensitive 1528 or recorded as a reminder of an appointment, road work, weather hazard or the like. Notes and/or instructions 1532 moment files 10 may be categorized and represented by a special icon 1500. Likewise a user 12 can leave a love note 1534 moment file 10 for a particular user at a special place (accessible at any time or at certain times). Dashboard moment files 1536 may be dispersed geographically providing users 12 with information about new features, changes, statistics, offers, and the like. Likewise, dashboard moments 1536 may provide a moment locator (moment radar) or clues relevant to a particular user/moment, class of user/moment, or the user/moment population.

So as to provide an enhanced social experience for users at least one embodiment may include drifting moments 10 designated by an icon 1538. Such moments may change location by time, user activity, holder 1006 requirements, or according to a pseudo-random operation of the system 100. In other embodiments users 12 may leave moment files 10 asking questions of an unknown but more knowledgeable user, or a known user, or a user with special characteristics. Such question moments 10 may be designated with a special moment icon 1542 ("Did anyone witness _____ on _____?"). Also available in a preferred embodiment of the system 100 are "easter egg" moments 10 (treasures) designated by an icon 1544 which provide user interest available from a holder 1006, another user 12, or the system 100 (specifically tailored for a particular user or the like). Other embodiments may include game or puzzle moments 10 designated by an icon 1546 where reading 300 such a moment may entitle a user to puzzle or game play (relevant to the geography, place or the like) where success earns chits or the like.

Cross-platform access may be provided by special moment content 10 allowing integration with users of other platforms or groups providing entertainment, tools, skills, or items valuable for trade in the system 100 or another platform.

As designated by an X 1550 representing a thing or object of real property 1552, personal property 1554 (stationary or a fixture 1554A or movable or portable 1554B), and virtual 1556, the system 100 may augment any of these forms of property with a user recordable/readable moment file 10.

Figure 16:
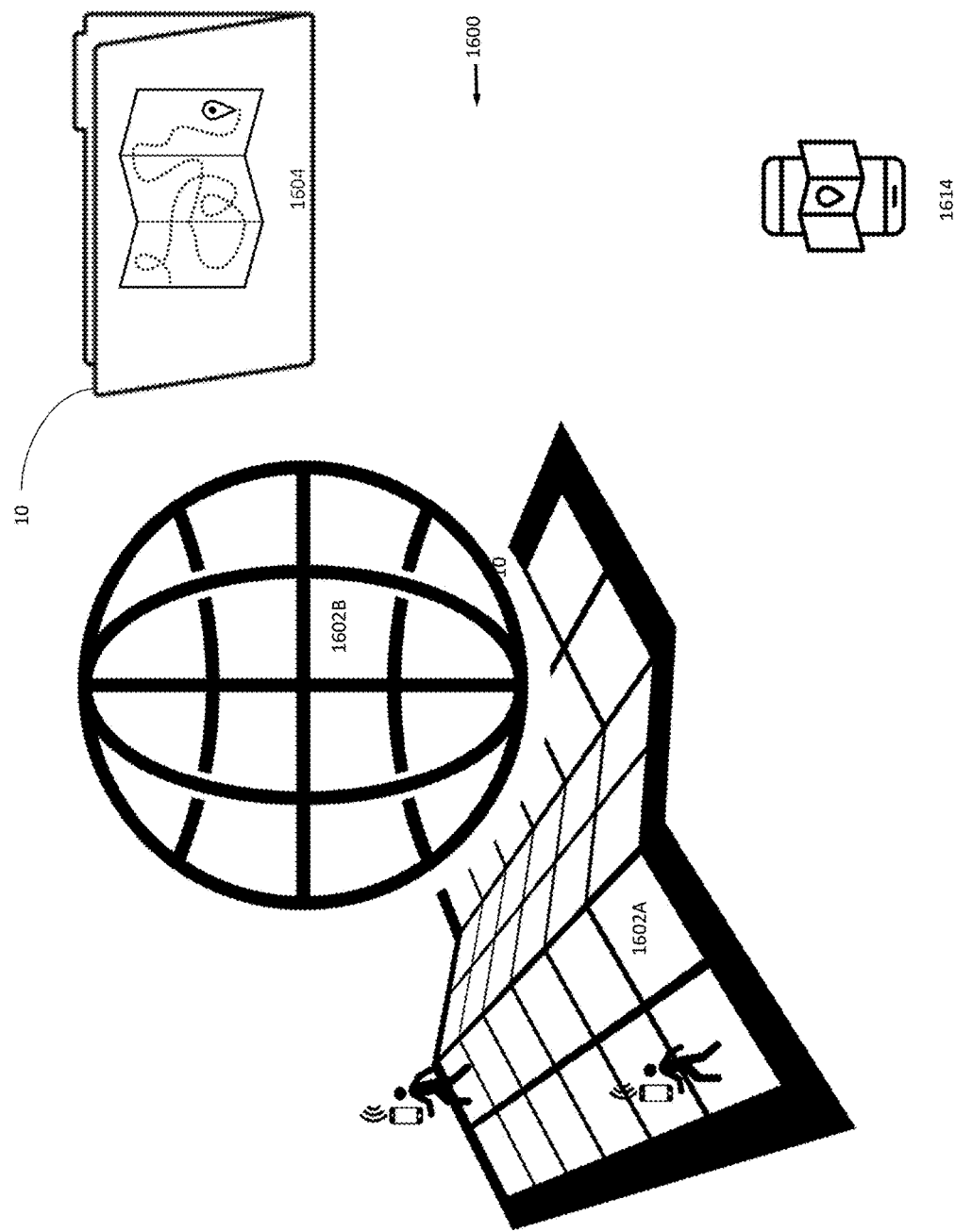
FIG. 16 is an environmental diagram illustrating a moment file based game for play on an unbounded or bounded augmented playing area based upon at least the real world and its real estate, the chattels distributed thereon, and a virtual space with or without defined boundaries.

Turning now to FIG. 16, a game player (user 12), a property holder 1006, the system 100, or the like may design a game 1600 with static rules, or rules which change according to time of day, day of week, player accomplishment, detours, player misdirection, or the like. A player 12 may be required to access a series of moments 10 placed randomly or intelligently across a bounded 1602A or unbounded 1602B real (or real and virtual or real and augmented) area in a particular order with or without solving a physical, mental, or social problem characterized by recording a moment 10 or the like at a particular location within a given time period or at a particular step. A user 12 may use a game play HANDY 1614 or the like to participate in reading/recording (300/200) moment files 10 in accordance with game rules/instructions 1604 represented by a game play instruction icon 1604 moment file 10.

Figure 17:
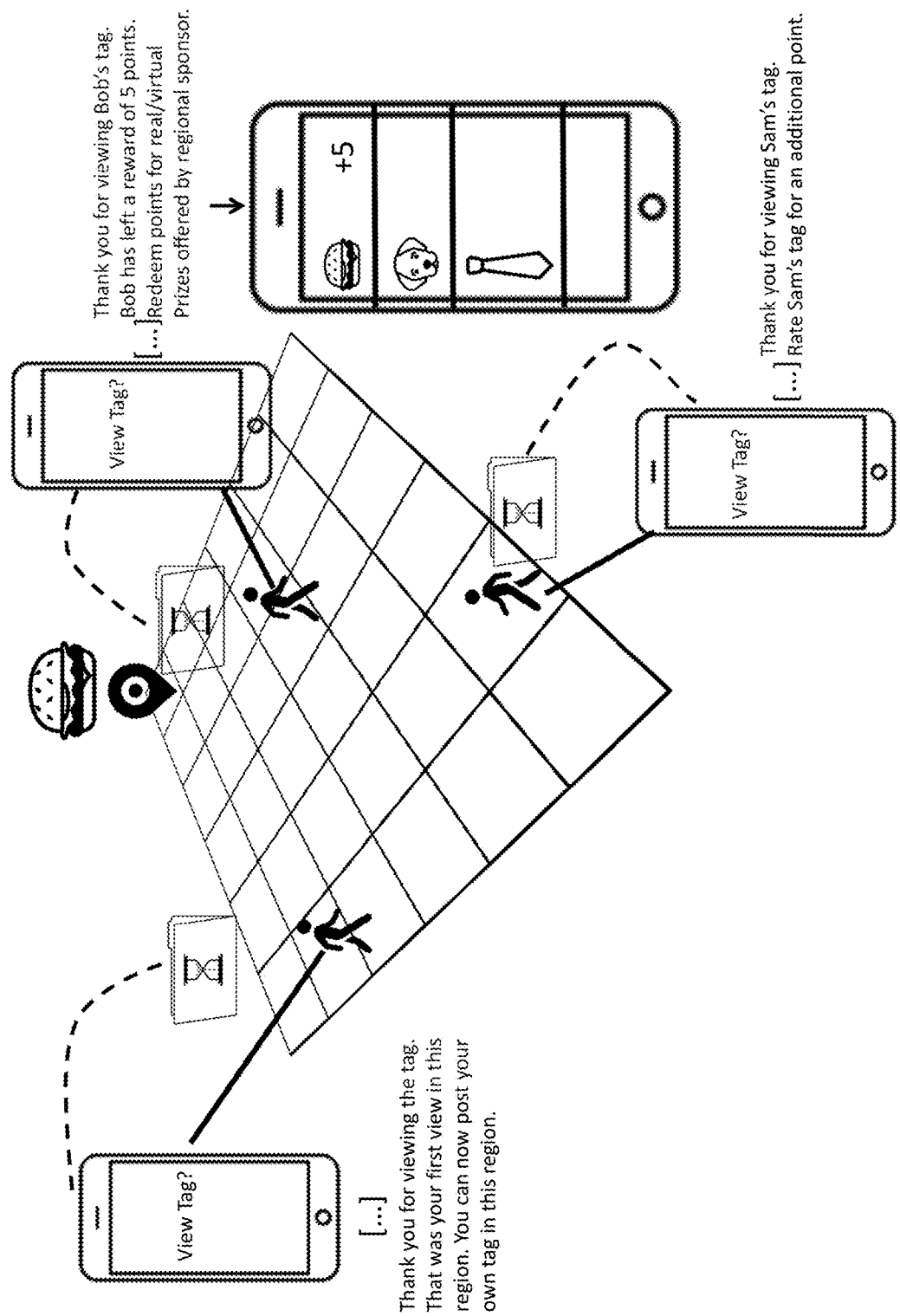
FIG. 17 is an environmental diagram of an awards system based upon a user characteristic such as participation as an embodiment of the present disclosure.

FIG. 17 illustrates a method of the system 100 for rewarding users 12 by how the user community rates a user's recorded content.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A device for recording and sharing moments with readers in proximity to the locus of a recorded moment, the device including a processor and comprising:
   (a) a moment recording system wherein the processor is capable of generating at least one moment file represented by a user selectable icon, the moment file comprising:
   a location temporally proximate to a moment recorder;
   an identifier of the moment recorder;
   a time;
   and
   at least two of an image, a video, a sound, a text, a mood, a place, and an activity;
   the moment file further comprising a source of locomotion, when the source has been determined by at least one of 1) an approximated velocity of the device and 2) a report of the source by device;
   (b) a moment reading system capable of reading the moment file when the device is substantially proximate to the locus;
   and
   (c) a filter for operatively and user selectably filtering the moment file according to a user interest selected from at least one of the identifier, a moment age, the time, a moment medium or media, a moment subject or interest, and a moment theme;

wherein the moment reading system is capable of receiving a notification for the user when the moment reading system is proximate to one or more of the filterably selected moment file and a moment file of interest; and wherein the device does not allow moment files to be read whenever the approximated velocity is either:
a first velocity between a walking pace and a posted speed limit at or near to said moment reading system; or
a second velocity greater than a posted vehicle traffic speed limit proximate to the device.

2. A device for recording and sharing moments with readers in proximity to the locus of a recorded moment, the device including a processor and comprising:
(a) a moment recording system wherein the processor is capable of generating at least one moment file represented by a user selectable icon, the moment file comprising:
a location temporally proximate to a moment recorder;
an identifier of the moment recorder;
a time;
and
at least two of an image, a video, a sound, a text, a mood, a place, and an activity;
the moment file further comprising a source of locomotion, when the source has been determined by at least one of 1) an approximated velocity of the device and 2) a report of the source by device;
(b) a moment reading system capable of reading the moment file when the device is substantially proximate to the locus;
and
(c) a filter for operatively and user selectably filtering the moment file according to a user interest selected from at least one of the identifier, a moment age, the time, a moment medium or media, a moment subject or interest, and a moment theme;
wherein a property holder may restrict the readability of moment files at certain times to at least one of all moment readers or a select reader or group of readers; and
wherein the moment reading system is capable of receiving a notification for the user when the moment reading system is proximate to one or more of the filterably selected moment file and a moment file of interest.

3. The device of claim 2 wherein a property holder and owner may restrict recording of moment files to particular users.

4. The device of claim 3 wherein said property holder and owner may restrict recording of moment files to moment file comments.

5. The device of claim 2 wherein a property holder or owner may require a fee for either posting or reading a moment file.

6. The device of claim 5 wherein a fee collected by said device may be distributed according to an agreement to at least one of a third party, a recorder, a reader, and a property holder or owner.

7. A device for recording and sharing moments with readers in proximity to the locus of a recorded moment, the device including a processor and comprising:
(a) a moment recording system wherein said processor is capable of generating a moment file represented by a user selectable icon, said moment file comprising a location (coordinates) temporally proximate to a moment recorder, an identification of a person experiencing a moment, and a time;
said moment file including at least two of a photograph, a video, a sound, a text, a mood, a place, and an activity;
(b) at least one moment reading system, capable of reading said moment file when said device is substantially proximate to the location (coordinates) where said moment file was recorded;
and
(c) a filter for operatively and user selectably filtering said moment file according to a user interest, selected from at least one of an identity of a moment recorder, a moment age, a moment creation time, a moment medium or media, a moment subject or interest, and a moment theme;
wherein said moment reading system is capable of receiving a notification when said moment reading system is proximate to one or more of said filterably selected moment file and a moment file of interest;
and
wherein the moment recording system leaves one or more clues to other moment files within the moment file.

8. A system for recording and sharing moments with readers in proximity to the locus of a recorded moment, comprising:
a device including a processor, the device comprising:
(a) a moment recording system wherein said processor is capable of generating a moment file represented by a user selectable icon, said moment file comprising a location (coordinates) temporally proximate to a moment recorder, an identification of a person experiencing a moment, and a time;
said moment file including at least two of a photograph, a video, a sound, a text, a mood, a place, and an activity;
(b) at least one moment reading system, capable of reading said moment file when said device is substantially proximate to the location (coordinates) where said moment file was recorded;
and
(c) a filter for operatively and user selectably filtering said moment file according to a user interest, selected from at least one of an identity of a moment recorder, a moment age, a moment creation time, a moment medium or media, a moment subject or interest, and a moment theme;
wherein said moment reading system is capable of receiving a notification when said moment reading system is proximate to one or more of said filterably selected moment file and a moment file of interest;
and further comprising:
a property auction system.

9. The device of claim 8 wherein said property auction allows property to be sold to be divisible temporally.

10. The device of claim 8 wherein said property auction allows property to be sold by holder category.

11. The device of claim 8 wherein said property auction allows property to be at least one of purchased, licensed or leased.

12. The device of claim 11 wherein said property auction allows property to be at least partially condemned by at least one of an abutting or adjacent real property owner.

13. The device of claim 8 wherein said property may be priced by at least user population, clicks, volume or area, moment file recorder identity, degree of onerousness of holder provided moment content which must be viewed by moment readers, frequency of chits or coupons provided to moment readers, user traffic, and user feedback.

14. The device of claim 8 further comprising a disagreement arbitration system for resolving disputes between at least one of users, recorders, readers, holders, and device administrators.

15. The device of claim 14 wherein said device may allow a particular social goal to be promoted.

16. The device of claim 15 wherein said social goal is to reduce at least one of traffic violations and littering.

17. The device of claim 16 wherein said device may score at least one of readers and recorders at least in part by a reputational characterization.

18. A device for recording and sharing moments with readers in proximity to the locus of a recorded moment, the device including a processor and comprising:
   (a) a moment recording system wherein the processor is capable of generating at least one moment file represented by a user selectable icon, the moment file comprising:
      a location temporally proximate to a moment recorder;
      an identifier of the moment recorder;
      a time;
      and
      at least two of an image, a video, a sound, a text, a mood, a place, and an activity;
      the moment file further comprising a source of locomotion, when the source has been determined by at least one of 1) an approximated velocity of the device and 2) a report of the source by device;
   (b) a moment reading system capable of reading the moment file when the device is substantially proximate to the locus;
   and
   (c) a filter for operatively and user selectably filtering the moment file according to a user interest selected from at least one of the identifier, a moment age, the time, a moment medium or media, a moment subject or interest, and a moment theme;
   wherein the moment reading system is capable of receiving a notification for the user when the moment reading system is proximate to one or more of the filterably selected moment file and a moment file of interest;
   and
   wherein the moment files may be stored for reading by the moment recorder when the moment recorder is not near the location of where the moment files were recorded.

19. The device of claim 18 wherein said stored moment files may expire and become unreadable.

20. The device of claim 19 wherein said stored moment files may have additional messages or content appended to them.

* * * * *